United States Patent
Mu (10) Patent No.: US 12,407,544 B2
(45) Date of Patent: Sep. 2, 2025

(54) METHOD AND DEVICE FOR CHANNEL ESTIMATION

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 396 days.

(21) Appl. No.: 17/928,907

(22) PCT Filed: Jun. 9, 2020

(86) PCT No.: PCT/CN2020/095178
§ 371 (c)(1),
(2) Date: Nov. 30, 2022

(87) PCT Pub. No.: WO2021/248329
PCT Pub. Date: Dec. 16, 2021

(65) Prior Publication Data
US 2023/0231743 A1  Jul. 20, 2023

(51) Int. Cl.
*H04L 25/02*  (2006.01)
*H04L 5/00*  (2006.01)

(52) U.S. Cl.
CPC ........ *H04L 25/0224* (2013.01); *H04L 5/0051* (2013.01); *H04L 5/0007* (2013.01)

(58) Field of Classification Search
CPC .................................................. H04L 25/0224
See application file for complete search history.

(56) References Cited

U.S. PATENT DOCUMENTS

| 12,150,152 | B2* | 11/2024 | Park | H04W 72/0446 |
| 2019/0223191 | A1 | 7/2019 | Kim et al. | |
| 2020/0008235 | A1 | 1/2020 | Sarkis et al. | |
| 2021/0044981 | A1* | 2/2021 | Bhattad | H04J 13/18 |
| 2023/0246778 | A1* | 8/2023 | Li | H04L 1/189 |
| | | | | 370/329 |

FOREIGN PATENT DOCUMENTS

| CN | 110474741 A | 11/2019 |
| WO | WO 2019139368 A1 | 7/2019 |

OTHER PUBLICATIONS

European Patent Application No. 20939752.0, Search and Opinion dated Feb. 20, 2024, 9 pages.
Indian Patent Application No. 20224707718, Office Action dated Jul. 4, 2023, 7 pages.
PCT/CN2020/095178 English translation of International Search Report dated Mar. 9, 2021, 2 pages.

* cited by examiner

*Primary Examiner* — Zhiren Qin
(74) *Attorney, Agent, or Firm* — Cozen O'Connor (57) ABSTRACT

A method for channel estimation includes: performing channel estimation using all DM-RSs in N continuous repeated CORESETs, where N is a positive integer greater than 1; in which the N continuous repeated CORESETs correspond to the same frequency domain resource and/or the same precoding matrix.

20 Claims, 3 Drawing Sheets

METHOD AND DEVICE FOR CHANNEL ESTIMATION

CROSS-REFERENCE TO RELATED APPLICATION

This application is a U.S. national phase of International Application No. PCT/CN2020/095178, filed on Jun. 9, 2020, the entire content of which is incorporated herein by reference.

TECHNICAL FIELD

The disclosure relates to the field of communications technologies, and particularly to, a method and a device for channel estimation.

BACKGROUND

A reduced capability UE is introduced into new radio (NR), also referred to as an NR-lite.

The reduced capability UE needs to satisfy the following requirements: low cost and low complexity; a certain degree of coverage enhancement; and power saving. To achieve the coverage enhancement, the reduced capability UE needs to support physical downlink control channel (PDCCH) repetitions.

SUMMARY

According to one aspect of the disclosure, a method for channel estimation is provided and includes: performing channel estimation using all DM-RSs included in N continuous repeated CORESETs, where N is a positive integer greater than 1; in which the N continuous repeated CORESETs correspond to the same frequency domain resource and/or the same precoding matrix.

According to one aspect of the disclosure, a method for channel estimation is provided and includes: transmitting N continuous repeated CORESETs, where N is a positive integer greater than 1; in which the N continuous repeated CORESETs correspond to the same frequency domain resource and/or the same precoding matrix and all DM-RSs included in the N continuous repeated CORESETs are configured for channel estimation by a terminal device.

According to one aspect of the disclosure, a terminal device is provided and includes: a processor; a transceiver connected to the processor; and a memory configured to store instructions executable by the processor; in which, the processor is configured to load and execute the executable instructions to perform the method for channel estimation as described in the above aspect.

According to one aspect of the disclosure, a network device is provided and includes: a processor; a transceiver connected to the processor; a memory configured to store instructions executable by the processor; in which, the processor is configured to load and execute the executable instructions to perform the method for channel estimation as described in the above aspect.

BRIEF DESCRIPTION OF THE DRAWINGS

To explain the technical solutions in embodiments of the disclosure more clearly, the drawings described in embodiments will be briefly introduced below. Obviously, the drawings described as below are only some embodiments of the disclosure. Those skilled in the art may obtain other drawings from these drawings without creative work.

DETAILED DESCRIPTION

To make purposes, technical solutions, and advantages of the disclosure clearer, embodiments of the disclosure will be further described below in connection with the accompanying drawings.

Figure 1:
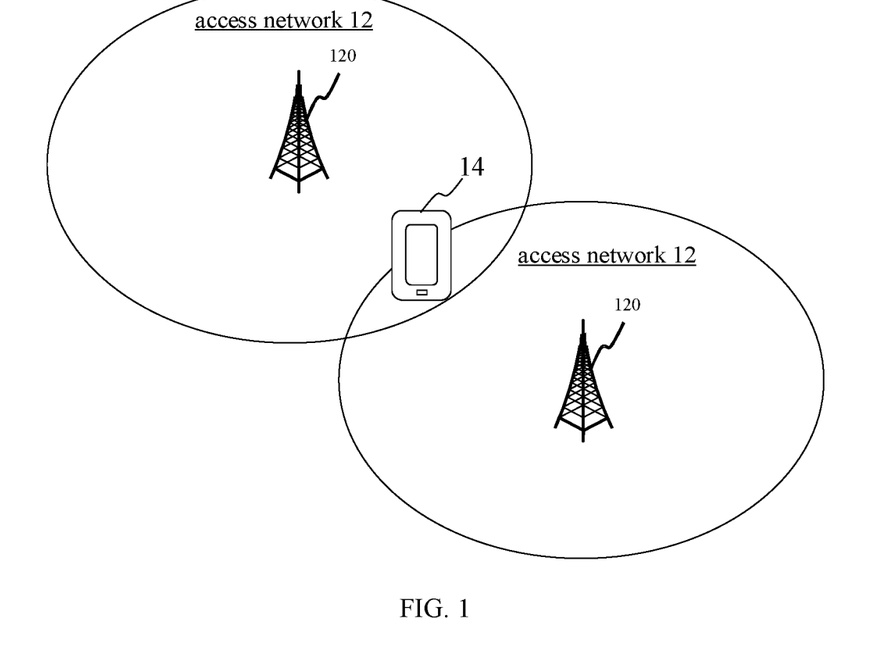
FIG. 1 is a block diagram illustrating a communication system according to some embodiments of the disclosure.

FIG. 1 is a block diagram illustrating a communication system according to some embodiments of the disclosure. The communication system may include access networks 12 and terminal devices 14.

The access network 12 includes several network devices 120. The network device 120 may be a base station (BS). The base station is an apparatus deployed in the access network to provide wireless communication functions for the terminal device. The base stations may include various forms of macro base stations, micro base stations, relay stations, access points, etc. In systems adopting different wireless access technologies, names of devices with base station function may vary. For example, in a long-term evolution (LTE) system, it is referred to as an evolved node base station (eNodeB or eNB); and in a fifth-generation (5G) NR system, it is referred to as a next generation node base station (gNodeB or gNB). With the evolution of communication technologies, the definition of "base station" may vary. For convenience of description in embodiments of the disclosure, the above apparatus that provides wireless communication functions for the terminal device 14 is collectively referred to as the network device.

The terminal devices 14 may include various handheld devices, vehicle devices, wearable devices or computing devices with wireless communication functions, or other processing devices connected to wireless modems, as well as various forms of user equipment(s) (UE), mobile stations (MS), terminal devices, etc. For convenience of description, the device mentioned above is collectively referred to as the terminal device. The network device 120 and the terminal device 14 communicate with each other through radio interface technologies, for example, a Uu interface.

Optionally, the terminal device 14 is a reduced capability UE. The reduced capability UE is a terminal device for higher rate and lower latency scenarios. The reduced capability UE needs to satisfy the following requirements: low cost and low complexity; a certain degree of coverage enhancement, and power saving.

The technical solutions in embodiments of the disclosure may be applied to various communication systems, for example, a global system of mobile communication (GSM), a code division multiple access (CDMA) system, a wideband code division multiple access (WCDMA) system, a general packet radio service (GPRS), a LTE system, a frequency division duplex (FDD) system, a time division duplex (TDD) system, an advanced long term evolution (LTE-A) system, a new radio (NR) system, an evolution NR system, an LTE-based access to unlicensed spectrum (LTE-U) system, an NR-U system, a universal mobile telecommunication system (UMTS), a worldwide interoperability for microwave access (WiMAX) communication system, a wireless local area network (WLAN), a wireless fidelity (Wi-Fi), a next generation of communication system, or other communication system.

Generally, the number of links supported by a conventional communication system is limited and easy to implement. However, with the development of communication technologies, a mobile communication system not only supports conventional communication, but also supports device to device (D2D) communication, machine to machine (M2M) communication, machine type communication (MTC), vehicle to vehicle (V2V) communication, and an Internet of Vehicles (V2X) etc. The embodiments of the disclosure further may be applied to these communication systems.

Figure 2:
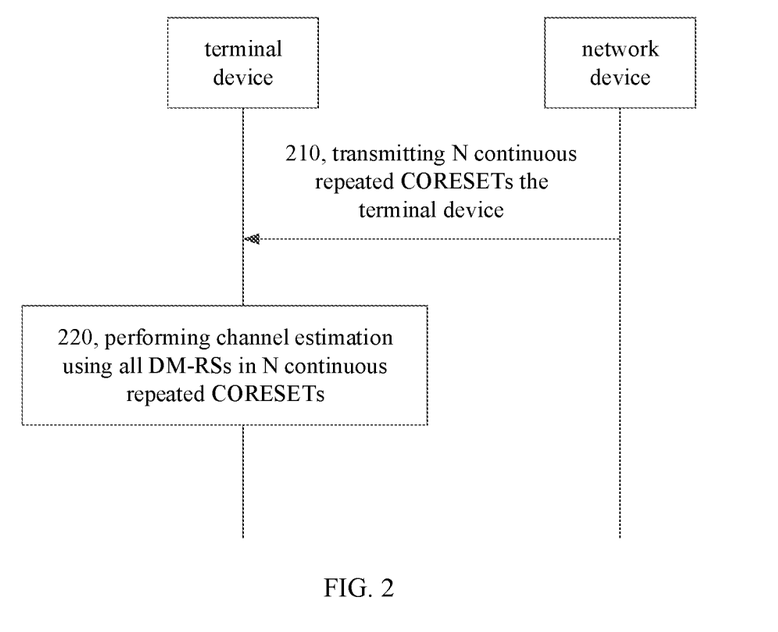
FIG. 2 is a flowchart illustrating a method for channel estimation according to some embodiments of the disclosure.

FIG. 2 is a flowchart illustrating a method for channel estimation according to some embodiments of the disclosure, which is applicable to the terminal device and the network device as illustrated in FIG. 1. The method includes the following.

At block 210, the network device transmits N continuous repeated CORESETs to the terminal device.

The N continuous repeated CORESETs correspond to the same frequency domain resource and/or the same precoding matrix, where N is an integer greater than 1.

The CORESET is a resource related to time and frequency on which the terminal device attempts to decode a possible PDCCH using one or more search spaces. The CORESET may be logically mapped to a set of continuous control channel elements (CCEs), and the PDCCH may be transmitted on one CCE or a set of several continuous CCEs, in which the CCE may correspond to several resource element groups (REGs). The size and the time-frequency position of the CORESET is semi-statically configured by the network device.

To achieve the coverage enhancement through PDCCH repetitions, the network device transmits the N continuous repeated CORESETs to the terminal device. The N continuous repeated CORESETs are continuous on the time domain and have the same frequency domain resource position, for example, all are located on frequency domain A to B. At the same time, the network device performs precoding on the N continuous CORESETs using the same precoder, so that each CORESET corresponds to the same precoding matrix and the terminal device performs accurate channel estimation using the N continuous CORESETs.

In some embodiments of the disclosure, the N continuous repeated CORESETs refer to N continuous repeated CORESETs that are all continuous on the time domain. In some embodiments of the disclosure, the N continuous repeated CORESETs have the same frequency domain resource position.

In some embodiments of the disclosure, the N continuous repeated CORESETs refer to M CORESETs in the N continuous repeated CORESETs that are continuous on the time domain and other N-M CORESETs and the M CORESETs that are discontinuous on the time domain, where 1<M<N. In some embodiments of the disclosure, the N continuous repeated CORESETs have the same frequency domain resource position.

At block 220, the terminal device performs channel estimation using all DM-RSs included in the N continuous repeated CORESETs.

Optionally, the terminal device is the reduced capability UE.

The DM-RS is a downlink physical signal not carrying high-level information and used by a physical layer. The DM-RS is configured for the terminal device to perform channel estimation and for related demodulation and decoding of a PDSCH.

Channel estimation refers to that the terminal device performs estimation for frequency domain or time domain transmission features of a transmission channel. The terminal device may acquire state information of the channel through channel estimation, so that distortion generated by data through a wireless multipath channel may be effectively counteracted and data transmitted by a transmitter may be correctly resumed, thereby improving the data transmission performance of the communication system.

Optionally, each CORESET includes a plurality of orthogonal frequency division multiplexing (OFDM) symbols on the time domain, each OFDM symbol has DM-RSs, and the terminal device performs channel estimation using all DM-RSs on the plurality of CORESETs or some DM-RSs therein. The N continuous repeated CORESETs are located at any position of one time slot on the time domain, for example, at a start position of one time slot; or at a middle position of one time slot, which is not limited in embodiments of the disclosure.

Optionally, a manner for channel estimation by the terminal device using all DM-RSs on the plurality of CORESETs or a part of DM-RSs includes but not limited to: a pilot frequency estimation manner, in which a common estimation criteria includes a least square criterion or a minimum mean square error criterion; or an interpolation manner including linear interpolation, constant interpolation, Gaussian interpolation, interpolation based on Discrete Fourier Transform (DFT), sine function interpolation or the like.

Optionally, the terminal device needs to determine a value of N before performing channel estimation using all the DM-RSs included in the N continuous repeated CORESETs. In a possible implementation, the terminal device determines the value of N based on a predefined rule. In another possible implementation, the terminal device receives at least one configuration information from the network device; and determines the value of N based on the at least one configuration information. Optionally, the network device transmits the at least one configuration information through a high layer signaling. Optionally, the network device transmits configuration information through a high layer signaling, and the configuration information is configured to indicate the numeric value of N; or the configuration information is configured to indicate the terminal device to calculate the value of N based on the configuration information; or the configuration information is an identifier corresponding to the parameter N, to cause the terminal device to determine the value of N based on a corresponding relation between preset identifiers and values of the identifiers. In another possible implementation, the terminal device determines the value of N based on a communication protocol.

Optionally, the terminal device needs to determine a value of M before performing channel estimation using all the DM-RSs on the M CORESETs in the N continuous repeated CORESETs. The value of M also may be determined in the same or similar way as the above way of determining N, which is not limited in embodiments of the disclosure.

In summary, in the method provided in the present embodiments, when the N continuous repeated CORESETs correspond to the same frequency domain resource and/or the same precoding matrix, the terminal device performs channel estimation using all the DM-RSs or a part of DM-RSs included in the N continuous repeated CORESETs, which achieves cross-CORESET channel estimation and improves the accuracy of channel estimation, compared with performing channel estimation only on one CORESET.

A method for transmitting a DM-RS is further provided in embodiments of the disclosure. Those skilled in the art may understand that the method for transmitting a DM-RS may be used together with or independently from any one embodiment of the disclosure.

In a first case, N continuous repeated CORESETs correspond to the same DM-RS pattern.

A distribution situation of DM-RSs on N continuous CORESETs are the same.

In a second case, N continuous repeated CORESETs correspond to different DM-RS patterns.

A distribution situation of DM-RSs on N continuous CORESETs are different. Optionally, DM-RS patterns corresponding to N continuous repeated CORESETs are independent with each other; or DM-RS patterns corresponding to N continuous repeated CORESETs are related but not independent with each other.

The above two cases are illustrated.

In a first case, N continuous repeated CORESETs correspond to the same DM-RS pattern.

In an alternative embodiment, a time domain length of each CORESET in the N continuous repeated CORESETs includes any one of: one OFDM symbol, two OFDM symbols or three OFDM symbols.

The time domain lengths of N continuous repeated CORESETs are the same, that is, all are one OFDM symbol or all are two OFDM symbols or all are three OFDM symbols. It needs to be noted that, in a future evolution, the time domain lengths of N continuous repeated CORESETs further may be other time lengths, which are not limited in embodiments of the disclosure.

Optionally, the DM-RS pattern includes a first DM-RS pattern; and the first DM-RS pattern includes: DM-RSs being distributed on a second resource element, a sixth resource element and a tenth resource element of an OFDM symbol in a CORESET, respectively.

One CORESET includes several OFDM symbols, and on each OFDM symbol, one resource block (RB) includes twelve resource elements (RES), and DM-RSs are fixed on the second RE, the sixth RE and the tenth RE, and this DM-RS pattern corresponding to the CORESET is the first DM-RS pattern. DM-RS patterns corresponding to N continuous repeated CORESETs are all the first DN-RS pattern.

It needs to be noted that, the same DM-RS patterns corresponding to N continuous repeated CORESETs further may be other DM-RS patterns in addition to the first DM-RS pattern, which are not limited in embodiments of the disclosure.

Figure 3:
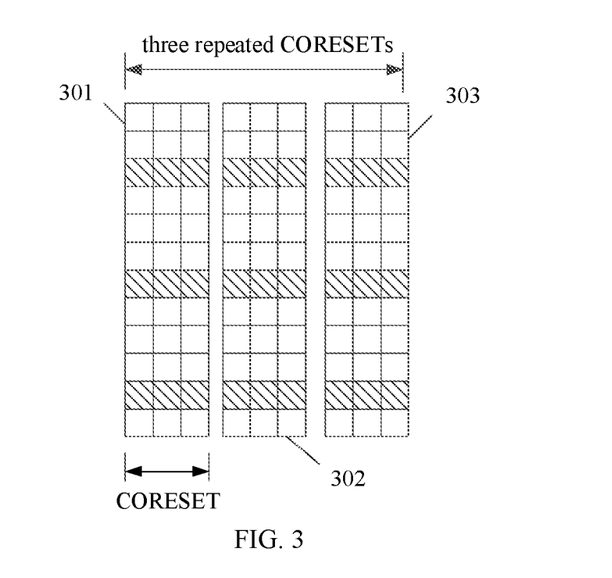
FIG. 3 is a diagram illustrating repeated CORESETs according to some embodiments of the disclosure.

In an example, as illustrated in FIG. 3, FIG. 3 is a diagram illustrating repeated CORESETs according to some embodiments of the disclosure.

N is 3, and N continuous repeated CORESETs include a CORESET 301, a CORESET 302 and a CORESET 303. The time lengths of the CORESET 301, the CORESET 302 and the CORESET 303 all are three OFDM symbols. In any one CORESET in three repeated CORESETs, DM-RSs are distributed on the second resource element, the sixth resource element and the tenth resource element of three OFDM symbols of the CORESET, respectively.

In a second case, N continuous repeated CORESETs correspond to different DM-RS patterns.

In an alternative embodiment, a time domain length of each CORESET in N continuous repeated CORESETs includes any one of: one OFDM symbol, two OFDM symbols or three OFDM symbols.

The time domain lengths of N continuous repeated CORESETs are the same, that is, all are one OFDM symbol or all are two OFDM symbols or all are three OFDM symbols. It needs to be noted that, in a future evolution, the time domain lengths of N continuous repeated CORESETs further may be other time lengths, which are not limited in embodiments of the disclosure.

In a possible implementation, the DM-RS pattern includes a second DM-RS pattern and a third DM-RS pattern; and distribution on a frequency domain of the third DM-RS pattern and distribution on a frequency domain of the second DM-RS pattern are different and independent with each other.

The second DM-RS pattern is a DM-RS pattern corresponding to one CORESET in N continuous repeated CORESETs, and the third DM-RS pattern is a DM-RS pattern corresponding to another CORSET in N continuous repeated CORESETs, and distribution of the second DM-RS pattern and distribution of the third DM-RS pattern are independent with each other. That is, the DM-RS patterns corresponding to any two CORESETs in N continuous repeated CORESETs are different and independent with each other.

Optionally, the number of DM-RSs in the second DM-RS pattern and the number of DM-RSs in the third DM-RS pattern are the same or different. That is, DM-RSs in the second DM-RS pattern and DM-RSs in the third DM-RS pattern are distributed on a resource elements, where a is a positive integer; or, DM-RSs in the second DM-RS pattern are distributed on b resource elements, and DM-RSs in the third DM-RS pattern are distributed on c resource elements, where, b and c are unequal positive integers.

Figure 4:
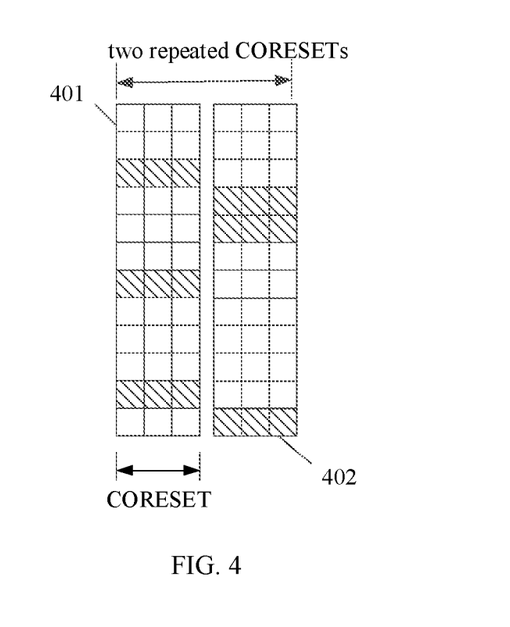
FIG. 4 is a diagram illustrating repeated CORESETs according to some embodiments of the disclosure.

In an example, as illustrated in FIG. 4, FIG. 4 is a diagram illustrating repeated CORESETs according to some embodiments of the disclosure.

N is 2 and N continuous repeated CORESETs include a CORESET 401 and a CORESET 402. The time domain lengths of the CORESET 401 and the CORESET 402 are three OFDM symbols. The CORESET 401 corresponds to the second DM-RS pattern, in which DM-RSs are distributed on the second resource element, the sixth resource element and the tenth resource element of three OFDM symbols in the CORESET 401, respectively. The CORESET 402 corresponds to the third DM-RS pattern, in which DM-RSs are distributed on the first resource element, the eighth resource element and the ninth resource element of three OFDM symbols in the CORESET 402, respectively. Distribution of the second DM-RS pattern and distribution of the third DM-RS pattern are independent with each other.

In another possible implementation, the DM-RS pattern includes a second DM-RS pattern and a third DM-RS pattern; and the third DM-RS pattern is a pattern formed after the second DM-RS pattern is shifted on a frequency domain.

When the second DM-RS pattern includes DM-RSs being distributed on an $a^{th}$ resource element, a $b^{th}$ resource element, and a $C^{th}$ resource element of the OFDM symbol in the CORESET, respectively, the third DM-RS pattern includes DM-RSs being distributed on an $(a+m)^{th}$ resource element, a $(b+m)^{th}$ resource element and a $(c+m)^{th}$ resource element of the OFDM symbol in the CORESET, respectively, or DM-RSs being distributed on an $(a-n)^{th}$ resource element, a $(b-n)^{th}$ resource element and a $(c-n)^{th}$ resource element of the OFDM symbol in the CORESET, respectively.

Since one resource block includes 12 resource elements, it may be understood that a, b, c, a+m, b+m, c+m, a−n, b−n and c−n are all positive integers not greater than 12. After the second DM-RS pattern is shifted on the frequency domain, a shifted certain resource element is a $d^{th}$ resource element, where d is an integer greater than 12 (or less than 1). In one implementation, the third DM-RS pattern does not include the resource element, and the DM-RS on the resource element does not exist in the CORESET corresponding to the third DM-RS pattern; in another implementation, modulo operation is performed on d using 12 to obtain e, and the DM-RS on an $e^{th}$ resource element exists in the CORESET corresponding to the third DM-RS pattern. For example, after the second DM-RS pattern is shifted on the frequency domain, the shifted DM-RS is distributed on the fourteenth resource element, and the DM-RS is distributed on the second resource element in the CORESET corresponding to the third DM-RS pattern.

Figure 5:
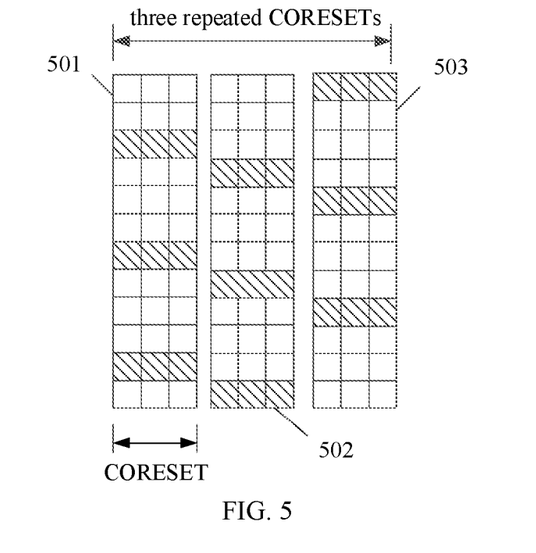
FIG. 5 is a diagram illustrating repeated CORESETs according to some embodiments of the disclosure.

In an example, as illustrated in FIG. 5, FIG. 5 is a diagram illustrating repeated CORESETs according to some embodiments of the disclosure.

N is 3, and N continuous repeated CORESETs include a CORESET 501, a CORESET 502 and a CORESET 503. The time lengths of the CORESET 501, the CORESET 502 and the CORESET 503 are three OFDM symbols. The CORESET 501 corresponds to the second DM-RS pattern, in which DM-RSs are distributed on the second resource element, the sixth resource element and the tenth resource element of three OFDM symbols in the CORESET, respectively. The CORESET 502 corresponds to the third DM-RS pattern, that is, DM-RSs are distributed on the first resource element, the fifth resource element and the ninth resource element of three OFDM symbols in the CORESET, respectively, which is a pattern formed after the second DM-RS pattern is shifted down by one resource element on the frequency domain. The CORESET 503 corresponds to another third DM-RS pattern, that is, DM-RSs are distributed on the fourth resource element, the eighth resource element and the twelfth resource element of three OFDM symbols in the CORESET, respectively, which is a pattern formed after the second DM-RS pattern is shifted down by two resource elements on the frequency domain.

Optionally, the second DM-RS pattern includes DM-RSs being distributed on a second resource element, a sixth resource element and a tenth resource element of an OFDM symbol in a CORESET, respectively.

Optionally, different DM-RS patterns corresponding to the N continuous repeated CORESETs are predetermined in a protocol, or determined based on second configuration information from the network device received by the terminal device. Optionally, the network device transmits the second configuration information through a high layer signaling.

In summary, in the method provided in the present embodiments, when the N continuous repeated CORESETs correspond to the same frequency domain resource and/or the same precoding matrix, the terminal device performs channel estimation using all the DM-RSs or a part of DM-RSs on the N repeated CORESETs, which achieves cross-CORESET channel estimation and improves the accuracy of channel estimation, compared with performing channel estimation only on one CORESET.

In the method provided in the embodiments, the DM-RS patterns corresponding to the N continuous repeated CORESETs may be the same or different and may be configured based on scenario requirements, which improves flexibility of the method for channel estimation. At the same time, when the DM-RS patterns corresponding to the N continuous repeated CORESETs are different, the DM-RSs are located on more different frequency points, thereby further improving the accuracy of channel estimation.

For any one CORESET in N continuous repeated CORESETs, the distribution situation of the DM-RSs on the CORESETs are regarded as the DM-RS pattern of the CORESET. In an alternative embodiment based on FIG. 2, it includes the above two cases the first case and the second case, which are not repeated in embodiments of the disclosure.

It needs to be noted that, the above method embodiments may be implemented independently or in combination, which are not limited in the disclosure. In the above each embodiment, blocks executed by the terminal device may be independently implemented as the method for channel estimation on one side of the terminal device, and blocks executed by the network device may be independently implemented as the method for channel estimation on one side of the network device.

Figure 6:
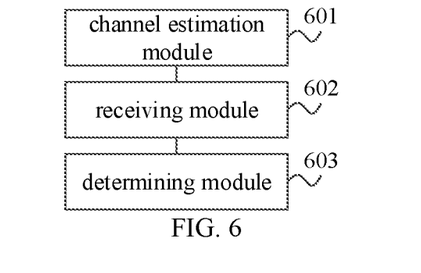
FIG. 6 is a block diagram illustrating an apparatus for channel estimation according to some embodiments of the disclosure.

FIG. 6 is a block diagram illustrating an apparatus for channel estimation according to some embodiments of the disclosure. The apparatus may be implemented as a terminal device or implemented as a part of the terminal device. The apparatus includes a channel estimation channel 601.

The channel estimation module 601 is configured to perform channel estimation using all DM-RSs included in N continuous repeated CORESETs, where N is a positive integer greater than 1; in which the N continuous repeated CORESETs correspond to the same frequency domain resource and/or the same precoding matrix.

Optionally, the apparatus further includes a receiving module 602 and a determining module 603.

In an alternative embodiment, the receiving module 602 is configured to receive first configuration information; and the determining module 603 is further configured to determine a value of N based on first configuration information; or the determining module 603 is configured to determine a value of N based on a communication protocol.

In an alternative embodiment, the N continuous repeated CORESETs correspond to the same DM-RS pattern.

In an alternative embodiment, the DM-RS pattern includes a first DM-RS pattern; the first DM-RS pattern includes DM-RSs being distributed on a second resource element, a sixth resource element and a tenth resource element of an OFDM symbol in a CORESET, respectively.

In an alternative embodiment, the N continuous repeated CORESETs correspond to different DM-RS patterns.

In an alternative embodiment, the DM-RS pattern includes a second DM-RS pattern and a third DM-RS pattern; distribution on a frequency domain of the third DM-RS pattern and distribution on a frequency domain of the second DM-RS pattern are different and independent with each other.

In an alternative embodiment, the DM-RS pattern includes a second DM-RS pattern and a third DM-RS pattern; the third DM-RS pattern is a pattern formed after the second DM-RS pattern is shifted on a frequency domain.

In an alternative embodiment, the second DM-RS pattern includes DM-RSs being distributed on a second resource element, a sixth resource element and a tenth resource element of an OFDM symbol in a CORESET, respectively.

In an alternative embodiment, the receiving module 602 is configured to receive second configuration information from a network device; and the determining module 603 is configured to determine different DM-RS patterns corresponding to the N continuous repeated CORESETs based on the second configuration information.

In an alternative embodiment, a time domain length of each CORESET in N continuous repeated CORESETs includes any one of: one OFDM symbol, two OFDM symbols or three OFDM symbols.

Figure 7:
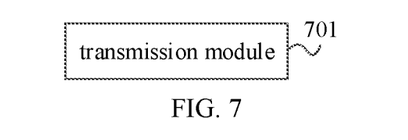
FIG. 7 is a block diagram illustrating an apparatus for channel estimation according to some embodiments of the disclosure.

FIG. 7 is a block diagram illustrating an apparatus for channel estimation according to some embodiments of the disclosure. The apparatus may be implemented as a network device or implemented as a part of the network device. The apparatus includes a transmission module 701.

The transmission module 701 is configured to transmit N continuous repeated CORESETs, where N is a positive integer greater than 1; in which the N continuous repeated CORESETs correspond to the same frequency domain resource and/or the same precoding matrix, and all DM-RSs included in the N continuous repeated CORESETs are configured for channel estimation by a terminal device.

In an alternative embodiment, the transmission module 701 is configured to transmit first configuration information to a terminal device; the first configuration information is configured to a value of N.

In an alternative embodiment, the N continuous repeated CORESETs correspond to the same DM-RS pattern.

In an alternative embodiment, the DM-RS pattern includes a first DM-RS pattern; the first DM-RS pattern includes DM-RSs being distributed on a second resource element, a sixth resource element and a tenth resource element of an OFDM symbol in a CORESET, respectively.

In an alternative embodiment, the N continuous repeated CORESETs correspond to different DM-RS patterns.

In an alternative embodiment, the DM-RS pattern includes a second DM-RS pattern and a third DM-RS pattern; distribution on a frequency domain of the third DM-RS pattern and distribution on a frequency domain of the second DM-RS pattern are different and independent with each other.

In an alternative embodiment, the DM-RS pattern includes a second DM-RS pattern and a third DM-RS pattern; the third DM-RS pattern is a pattern formed after the second DM-RS pattern is shifted on a frequency domain.

In an alternative embodiment, the second DM-RS pattern includes DM-RSs being distributed on a second resource element, a sixth resource element and a tenth resource element of an OFDM symbol in a CORESET, respectively.

In an alternative embodiment, the transmission module 701 is configured to transmit second configuration information to a terminal device; the second configuration information is configured to configure different DM-RS patterns corresponding to the N continuous repeated CORESETs.

In an alternative embodiment, a time domain length of each CORESET in the N continuous repeated CORESETs includes any one of: one OFDM symbol, two OFDM symbols or three OFDM symbols.

It should be noted that, when the apparatus provided in the above embodiments implement its function, only the division of the above function modules is illustrated. In practical applications, allocation of the above functions may be completed by different function modules according to requirements, that is, the internal structure of the device is divided into different function modules to complete all or part of functions described above. In addition, the apparatus provided in some embodiments and the method embodiments belong to the same concept. For the detailed implementation process, reference should be made to the method embodiments, which is not repeated herein.

Figure 8:
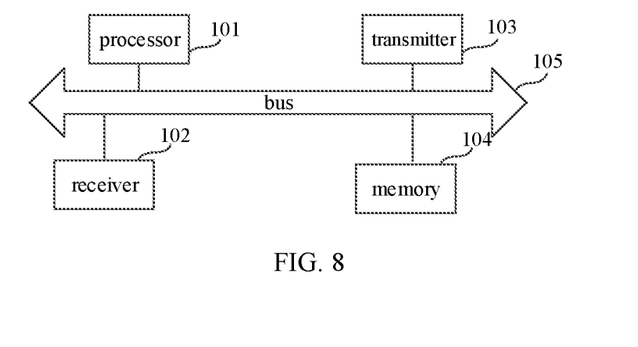
FIG. 8 is a block diagram illustrating a communication device according to some embodiments of the disclosure.

FIG. 8 is a diagram illustrating a structure of a communication device (a terminal device or a network device) according to some embodiments of the disclosure. The communication device includes a processor 101, a receiver 102, a transmitter 103, a memory 104 and a bus 105.

The processor 101 includes one or more processing cores, and the processor 101 executes various function applications and information processings by running software programs or modules.

The receiver 102 and the transmitter 103 may be implemented as a communication component, which may be a communication chip.

The memory 104 is communicatively connected to the processor 101 through the bus 105.

The memory 104 may be configured to store at least one instruction, and the processor 101 is configured to execute the at least one instruction to implement all steps in the above embodiments.

In addition, the memory 104 may be implemented by any type of volatile or non-volatile storage devices or their combination. The volatile or non-volatile storage device includes but not limited to a magnetic disk or an optical disk, an electrically erasable programmable read-only memory (EEPROM), an erasable programmable read-only memory (EPROM), a static random-access memory (SRAM), a read-only memory (ROM), a magnetic memory, a flash memory or a programmable read-only memory (PROM).

A computer readable storage medium is further provided in some embodiments, in which the computer readable storage medium stores at least one instruction, at least one program, a code set and an instruction set, the at least one instruction, the at least one program, the code set or the instruction set may be loaded and executed by the processor to implement the method for channel estimation executed by the communication device provided in each method embodiment.

In some embodiments, a computer program product is further provided, and configured to cause a device including a processor and a memory to perform the method as described in the above aspect when executed on the device. The computer program product may be included in a tangible and non-transitory computer readable storage medium or provided on a tangible and non-transitory computer readable storage medium.

Those skilled in the art may understand that all or part of steps in the above embodiments may be implemented by hardware, or by a program to instruct relevant hardwares, in which the program may be stored in a computer readable storage medium which may be a read-only memory, a magnetic disk or an optical disk, etc.

The above are only alternative embodiments in embodiments of the disclosure, and do not constitute a limitation of the disclosure. Any modification, equivalent replacement, improvement, etc., made within the spirit and principle of embodiments of the disclosure shall be included within the protection scope of embodiments of the disclosure.

The invention claimed is:

1. A method for channel estimation, performed by a terminal device, comprising:
   performing channel estimation using all demodulation reference signals (DM-RSs) included in N continuous repeated control-resource sets (CORESETs), where N is a positive integer greater than 1;
   wherein, the N continuous repeated CORESETs correspond to both of the same frequency domain resource and the same precoding matrix, the same precoding matrix is obtained by precoding on the N continuous CORESETs using a same precoder;
   wherein, M CORESETs in the N continuous repeated CORESETs are continuous on a time domain and other N-M CORESETs and the M CORESETs are discontinuous on the time domain, where 1<M<N.

2. The method as claimed in claim 1, further comprising:
   receiving configuration information, to determine a value of N based on the configuration information;
   or,
   determining a value of N based on a communication protocol.

3. The method as claimed in claim 1, wherein,
   the N continuous repeated CORESETs correspond to a same DM-RS pattern.

4. The method as claimed in claim 3, wherein,
   the DM-RS pattern comprises a first DM-RS pattern;
   wherein, the first DM-RS pattern comprises at least twelve resource elements: the DM-RSs being distributed on a second resource element, a sixth resource element and a tenth resource element of the at least twelve resource elements of an orthogonal frequency division multiplexing (OFDM) symbol in a CORESET, respectively.

5. The method as claimed in claim 1, wherein,
   the N continuous repeated CORESETs correspond to different DM-RS patterns.

6. The method as claimed in claim 5, wherein,
   the different DM-RS patterns comprising a first DM-RS pattern and a second DM-RS pattern;
   wherein, distribution on a frequency domain of the second DM-RS pattern and distribution on a frequency domain of the first DM-RS pattern are different and independent with each other.

7. The method as claimed in claim 6, wherein,
   the first DM-RS pattern comprises DM-RSs being distributed on a second resource element, a sixth resource element and a tenth resource element of at least twelve resource elements of an OFDM symbol in a CORESET, respectively.

8. The method as claimed in claim 5, wherein,
   the different DM-RS patterns comprise a first DM-RS pattern and a second DM-RS pattern;
   wherein, the second DM-RS pattern is a pattern formed after the first DM-RS pattern is shifted on a frequency domain;
   in a case that a shifted resource element is a $d^{th}$ resource element, where d is an integer greater than 12 or less than 1, modulo operation is performed on d using 12 to obtain e, and the DM-RS on an $e^{th}$ resource element exists in a CORESET corresponding to the second DM-RS pattern.

9. The method as claimed in claim 5, further comprising:
   receiving configuration information from a network device; and
   determining the different DM-RS patterns corresponding to the N continuous repeated CORESETs based on the configuration information.

10. The method as claimed in claim 1, wherein, a time domain length of each CORESET in the N continuous repeated CORESETs comprises any one of:
    one OFDM symbol, two OFDM symbols or three OFDM symbols.

11. A method for channel estimation, performed by a network device, comprising:
    transmitting N continuous repeated control-resource sets (CORESETs), where N is a positive integer greater than 1;
    wherein, the N continuous repeated CORESETs correspond to one or both of the same frequency domain resource and the same precoding matrix, the same precoding matrix is obtained by precoding on the N continuous CORESETs using a same precoder, and all demodulation reference signals (DM-RSs) included in the N continuous repeated CORESETs are configured for channel estimation by a terminal device;
    wherein, M CORESETs in the N continuous repeated CORESETs are continuous on a time domain and other N-M CORESETs and the M CORESETs are discontinuous on the time domain, where 1<M<N.

12. The method as claimed in claim 11, further comprising:
    transmitting configuration information for determining a value of N.

13. The method as claimed in claim 11, wherein,
    the N continuous repeated CORESETs correspond to a same DM-RS pattern,
    the DM-RS pattern comprises a first DM-RS pattern;
    wherein, the first DM-RS pattern comprises: DM-RSs being distributed on a second resource element, a sixth resource element and a tenth resource element of at least twelve resource elements of an orthogonal frequency division multiplexing (OFDM) symbol in a CORESET, respectively.

14. The method as claimed in claim 11, wherein,
    the N continuous repeated CORESETs correspond to different DM-RS patterns,
    the different DM-RS pattern comprises a first DM-RS pattern and a second DM-RS pattern;
    wherein, distribution on a frequency domain of the second DM-RS pattern and distribution on a frequency domain of the first DM-RS pattern are different and independent with each other.

15. The method as claimed in claim 14, wherein,
    the first DM-RS pattern comprises DM-RSs being distributed on a second resource element, a sixth resource element and a tenth resource element of at least twelve resource elements of an OFDM symbol in a CORESET, respectively.

16. The method as claimed in claim 14, further comprising:
    transmitting configuration information to the terminal device;
    wherein, the configuration information is configured to configure the different DM-RS patterns corresponding to the N continuous repeated CORESETs.

17. The method as claimed in claim 11, wherein,
wherein, the second DM-RS pattern is a pattern formed after the first DM-RS pattern is shifted on the frequency domain;
in a case that a shifted resource element is a $d^{th}$ resource element, where d is an integer greater than 12 or less than 1, modulo operation is performed on d using 12 to obtain e, and the DM-RS on an $e^{th}$ resource element exists in a CORESET corresponding to the second DM-RS pattern.

18. The method as claimed in claim 11, wherein, a time domain length of each CORESET in the N continuous repeated CORESETs comprises any one of:
one OFDM symbol, two OFDM symbols or three OFDM symbols.

19. A terminal device, comprising:
a processor;
a transceiver connected to the processor; and
a memory configured to store instructions executable by the processor;
wherein, the processor is configured to load and execute the executable instructions to:
perform channel estimation using all demodulation reference signals (DM-RSs) included in N continuous repeated control-resource sets (CORESETs), where N is a positive integer greater than 1;
wherein, the N continuous repeated CORESETs correspond to one or both of the same frequency domain resource and the same precoding matrix, the same precoding matrix is obtained by precoding on the N continuous CORESETs using a same precoder;
wherein, M CORESETs in the N continuous repeated CORESETs are continuous on a time domain and other N-M CORESETs and the M CORESETs are discontinuous on the time domain, where 1<M<N.

20. A network device, comprising:
a processor;
a transceiver connected to the processor; and
a memory configured to store instructions executable by the processor;
wherein, the processor is configured to load and execute the executable instructions to perform the method as claimed in claim 11.

* * * * *